US006684980B2

(12) United States Patent
Hungerford, III (10) Patent No.: US 6,684,980 B2
(45) Date of Patent: Feb. 3, 2004

(54) MINIMAL INVENTORY PACKAGE AND DELIVERY SYSTEM IN A RETAIL BUSINESS ENVIRONMENT

(75) Inventor: C. Stuart Hungerford, III, Clearwater, FL (US)

(73) Assignee: KHSH Enterprises, LLC, Litchfield, CT (US)

( * ) Notice: Subject to any disclaimer, the term of this patent is extended or adjusted under 35 U.S.C. 154(b) by 215 days.

(21) Appl. No.: 10/040,097

(22) Filed: Jan. 2, 2002

(65) Prior Publication Data

US 2003/0126030 A1 Jul. 3, 2003

(51) Int. Cl.$^7$ .............................. B42D 15/04; G09F 1/00
(52) U.S. Cl. ...................... 186/52; 229/92.8; 40/124.06
(58) Field of Search .................. 186/52, 35; 40/124.06, 40/124.11, 360, 642.01, 124; 229/92.8, 921; 283/56, 60.1; 700/216, 225, 226; 705/26, 28

(56) References Cited

U.S. PATENT DOCUMENTS

| | | | |
|---|---|---|---|
| 515,275 A | * | 2/1894 | Bishoprick ................ 229/74 |
| 1,126,411 A | * | 1/1915 | D'Arcy .................... 229/70 |
| 1,205,355 A | * | 11/1916 | Kennedy ................... 462/64 |
| 1,405,002 A | | 1/1922 | Rhodes |
| 1,736,726 A | | 11/1929 | Young |
| 2,058,648 A | | 10/1936 | Wellman |
| 3,351,183 A | | 11/1967 | Sammarco |
| 3,567,014 A | | 3/1971 | Feigelman |
| 3,595,383 A | | 7/1971 | Boylan |
| 3,690,450 A | | 9/1972 | Sheldon |
| 3,786,914 A | | 1/1974 | Beutler |
| 3,848,735 A | | 11/1974 | McGee et al. |
| 3,968,927 A | * | 7/1976 | Katz et al. ................. 229/70 |
| 4,430,843 A | | 2/1984 | Favale |
| 4,735,356 A | | 4/1988 | Engel |
| 4,957,311 A | * | 9/1990 | Geisenheimer ............... 283/56 |
| 5,076,490 A | * | 12/1991 | Dulin ...................... 229/92.8 |
| 5,199,662 A | | 4/1993 | Klupt |
| 5,437,478 A | * | 8/1995 | Gaines ..................... 283/117 |
| 5,469,965 A | | 11/1995 | Stearns |
| 5,566,981 A | * | 10/1996 | Alcordo .................... 283/58 |
| 5,722,538 A | | 3/1998 | Neely et al. |
| 5,924,737 A | * | 7/1999 | Schrupp ................... 283/58 |
| 6,170,665 B1 | | 1/2001 | Pehr |
| 6,179,202 B1 | * | 1/2001 | Alexander et al. ........ 229/92.8 |
| 6,241,084 B1 | | 6/2001 | Gyr |

FOREIGN PATENT DOCUMENTS

| GB | 2.053.138 A | * | 2/1981 | |
| GB | 2.248.598 A | * | 4/1992 | ............ G09F/3/02 |

OTHER PUBLICATIONS

Printed pages from website "www.bookwear.com".

* cited by examiner

Primary Examiner—Donald P. Walsh
Assistant Examiner—Mark J Beauchaine
(74) Attorney, Agent, or Firm—Dennis G. LaPointe; Mason Law PA (57) ABSTRACT

The specification and drawings describe and show a package and delivery system method and display to be used in a retail business environment where customers choose to purchase an item represented by a displayed example. The delivery is handled through a central facility and a post card is used by the purchaser to notify the recipient of the impending receipt of the purchased item. The invention allows for a retailer to operate in essentially an inventory free environment. Graphic designs included on the postcard may be limited edition prints. It is emphasized that this abstract is provided to comply with the rules requiring an abstract that will allow a searcher or other reader to quickly ascertain the subject matter of the technical disclosure. It is submitted with the understanding that it will not be used to interpret or limit the scope of meaning of the claims. 37 CFR 1.72(b).

67 Claims, 10 Drawing Sheets

MINIMAL INVENTORY PACKAGE AND DELIVERY SYSTEM IN A RETAIL BUSINESS ENVIRONMENT

The invention relates to a package and delivery system for retail accessory items and method of use, utilizing a display and a central order fulfillment facility. The system enables the retailer to maintain a minimal inventory of each retail item displayed.

The invention constitutes a retail display that is an underlying core feature of a retail business method for purchasing consumer items that are packaged at an order fulfillment facility or center in graphically appealing boxes, and that are sent via domestic and international postal means or commercial carriers.

The invention enables the retailer to more effectively use valuable floor space by eliminating the need to stock, both on the sales floor and in designated warehouse space, a significant inventory of product. In fact, the retailer is able to offer more items, typically accessory items, because the retailer needs only a representative sampling of the actual product or just photographs, illustrations, and other representative models of the products being offered for sale. This is done by the use of a display where a buyer can view the sampling and purchase the item by taking and completing the information on a card, which serves both as a receipt for the buyer and an order form, which in turn, is forwarded to a central distribution center or order fulfillment facility.

Most department stores and other retail outlets sell items from hangars on racks or on tables. This is cumbersome to the purchaser as the purchaser has to move through the inventory to make an eventual selection, checking not only for right style or size, but also checking to see if other consumers rummaging through the stock may have soiled or damaged the product, thereby selecting the least handled product being offered for sale. Sales clerks or stock personnel have to spend a lot of time re-stocking the sales floor, refolding clothing items, and relocating misplaced items to their proper rack or table. As a result, retailers have to hire more employees who cannot devote their time to assisting potential customers, resulting in loss sales.

The new display characteristic of the invention can free up low profit areas of floor plans and instead create small profit centers in place of expensive racking and inventory requirements. In effect, each display is tantamount to a store within a store.

The order fulfillment facility sends the purchased item to the recipient by whatever shipping or mailing means chosen and pre-purchased by the buyer.

The receipt portion of the card is preferably of a postcard form, which can be addressed to a third party recipient, thereby notifying the recipient of the eventual receipt of a gift from the purchaser or confirming that the buyer has made a proxy purchase of an item on behalf of the recipient and the recipient should expect imminent or impending delivery.

The invention would be extremely useful and beneficial to merchants in Biz Ops, Sports Venues, private labeling business for other manufacturers, gift shops, kiosks and retail establishments in malls and plazas that sell accessory items such as ties, belts, novelty products, wallets, shirts, lingerie, cosmetics, jewelry, watches and the like, ships' stores on cruise vessels, shops in airline terminals. Space is crucial to each of these types of commercial establishments. Stocking inventory is costly and unsold product on floor space for which the monthly rental cost per square foot is anywhere from $15.00 to $50.00 is counter-productive to the effective commercial viability of many business establishments. Many compromise by not offering a greater variety of products because they simply lack floor space and they can not afford the move to a larger store.

As styles change, the establishments then have to sell off the inventory at sales prices, often less than actual cost, which results in operating losses due to the fixed overhead costs associated with floor space.

Regarding the ships' stores, gift shops and airline terminal shops, the invention is very accommodating to the needs international tourism. Tourists purchase items and then must worry about carrying the items or packing the items. This can be an inconvenience when purchased gifts need to be packed in suitcases that are already over-packed. Many items are purchased at the last moments as a tourist or traveler is entering the terminal or leaving the cruise ship. As a result, the purchaser must carry the purchased item in a bag as a carry-on. Not only is this another burden on the traveler, the incentive to purchase items is presently diminished as a result of the aftermath of the horrific events occurring on Sep. 11, 2001. Travelers can no longer bring carry-on baggage on certain airlines or are limited to one carry-on baggage. As sales drop in terminal shops, these shops may eventually have to close. The present invention allows sales to continue at present levels without burdening the traveler or airlines with additional baggage storage needs.

The invention covers the concept of retailers selling prepackaged apparel and other items in specific packaging. The tourist can view the product line in the inventory free display at a retail location or airport or other retail business establishments by means of sample packaging and limited examples of apparel and/or accessory items that are displayed. The examples of packaging can be exact examples and/or photos or illustrations of the packaging encompassing all design elements.

The retailer sells the apparel or accessory item by typically charging the consumer's credit card or debit card, although the retailer may still take checks or cash. The retailer typically takes from the consumer a combination card comprising a two part separable form, generally separated by a perforated line. One portion of the card is effectively the order form which is processed to ship the purchased item to the recipient and the other (second) portion of the form is effectively a receipt that also serves as a postcard, which can be sent by the purchaser to the eventual recipient of the purchased item. In this way, the postcard serves as a notification to the recipient that the accessory item is in the process of being shipped (mailed) directly to the recipient. Alternatively, the consumer may travel home and give the postcard as a notice of the gift that will be shipped to the recipient.

The retailer sends the order information inclusive of design, item, size, etc., to a central distribution center or order fulfillment facility by phone or email, or by a website pull down menu. The facility may be one owned and operated by the retail establishment or it may be an independent facility. After the order is received, the fulfillment center sends the purchased item to the final recipient destination using addressee information provided by the purchaser on the order portion of the combination order/postcard.

The inventory free method and its display serves to direct the consumer to what the product is in terms of the offered apparel items being sold. The display may include information on how the delivery system works and how to use it, including how to return items.

In a preferred embodiment, the invention includes providing a package and delivery system display in a retail business establishment. The display typically would include a rack or holder for a plurality of a separable postcard and order combination card. The display would also have an example of the accessory item offered for sale by the retail business establishment.

The display may be a stand alone stand or table with hangers or holders for the postcard/order combination card and other related information literature or brochures. The display may have a designated area for hanging a sample of the accessory item. The accessory item may be framed or enclosed if it is a special clothing item, jewelry item, or any other item that the retailer deems appropriate to provide some measure of protection and security. The display should also have a designated portion, such as a projecting shelf or flat surface for use by purchasers in completing the requested information on the postcard/order combination card. If the accessory item can be purchased in a variety of colors, materials or styles (such as collarless and with collar, or long sleeve and short sleeve), the display may have a designated portion for attaching or hanging color swatches or material swatches, or photographs or the graphic illustrations of the available options.

The purchaser takes the postcard and order combination card from the display after deciding to purchase the desired accessory item represented by the example on the display. The purchaser annotates a name and address of an intended recipient on the order portion of the combination card, presents the combination card to a cashier and purchases the desired accessory item by paying a pre-calculated price. The pre-calculated price preferably includes all shipping and handling fees for shipping the desired accessory item to the intended recipient by private or governmental mail and package delivery methods, for example, the U.S. Postal Service, Fedex, UPS, and similar services using domestic and international mail and package delivery services.

The retailer retains the order portion of the combination card and the purchaser retains the postcard portion of the combination card. The retailer then forwards the order portion of the combination card to an order fulfillment facility, which then places the desired accessory item in a shipping container pre-sized to contain the purchased desired accessory item. Of course, the shipping container may already be pre-packaged.

The order fulfillment facility then places the name and address of the intended recipient on the shipping container, and mails the shipping container to the intended recipient by the selected private or governmental mail and package delivery method.

The use of the display and order fulfillment process enables the retailer to maintain a minimal inventory of the accessory item.

Although generally not limited thereto, it is anticipated that the accessory item best suited for immediately capitalizing on the invention is clothing apparel. Clothing apparel typically falls under the category of clothing accessories, including, but not limited to, shirt, socks, underwear, swim suits, belts, ties, shoes, purses, hand bags, and wallets, and other clothing accessories, or apparel may fall under the category of boutique items for clothing, including, but not limited to, jewelry, cuff links, tie clips, nail clipper set, and other boutique items for clothing, including lingerie and cosmetic products.

Additional description of the preferred embodiments of the invention are further described below in reference to the flow charts and diagrammatic representations embodied in the drawings described hereinafter.

Figure 1:
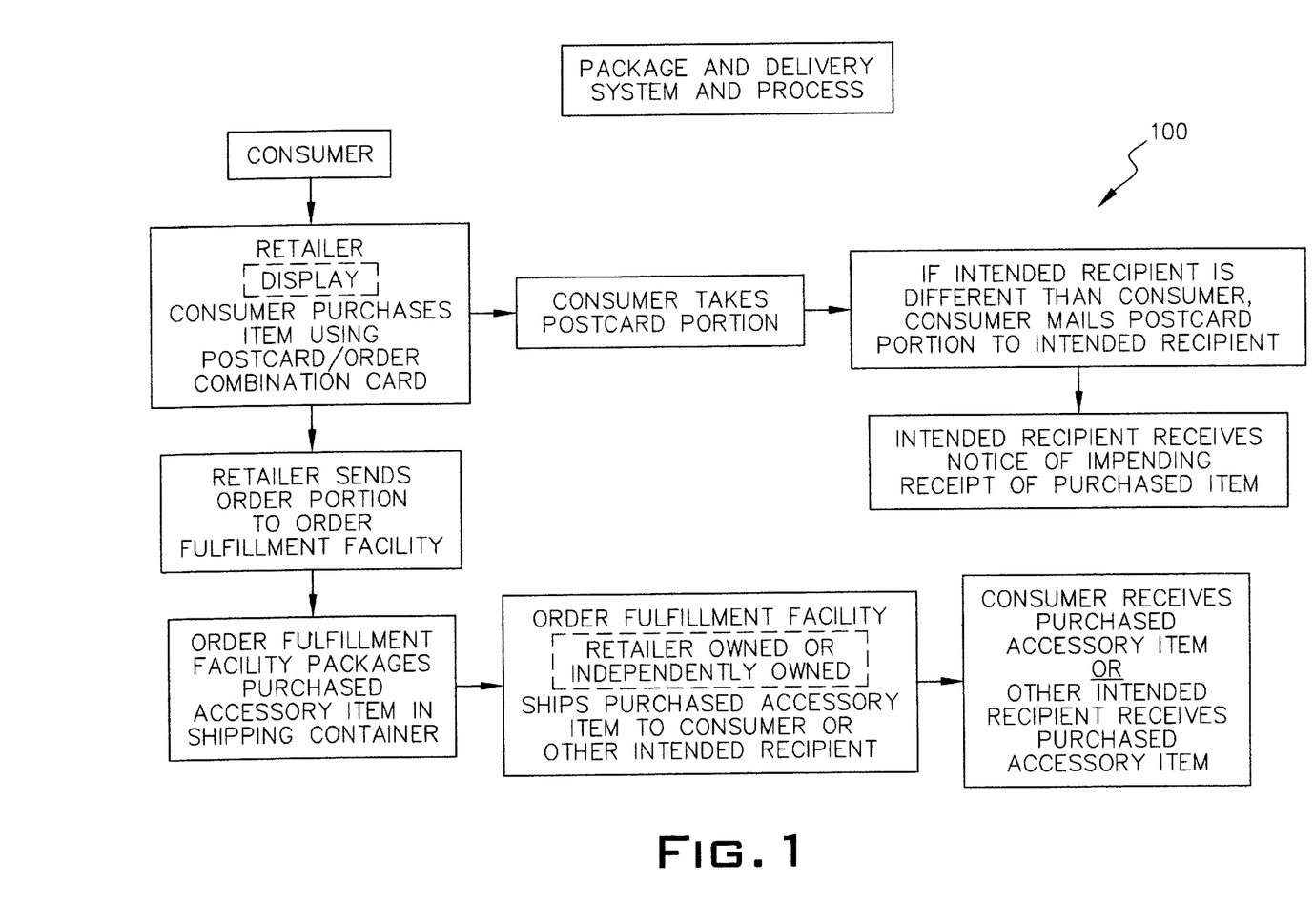
FIG. 1 is a flow chart depicting the overall system and process in the present invention.
Figure 5:
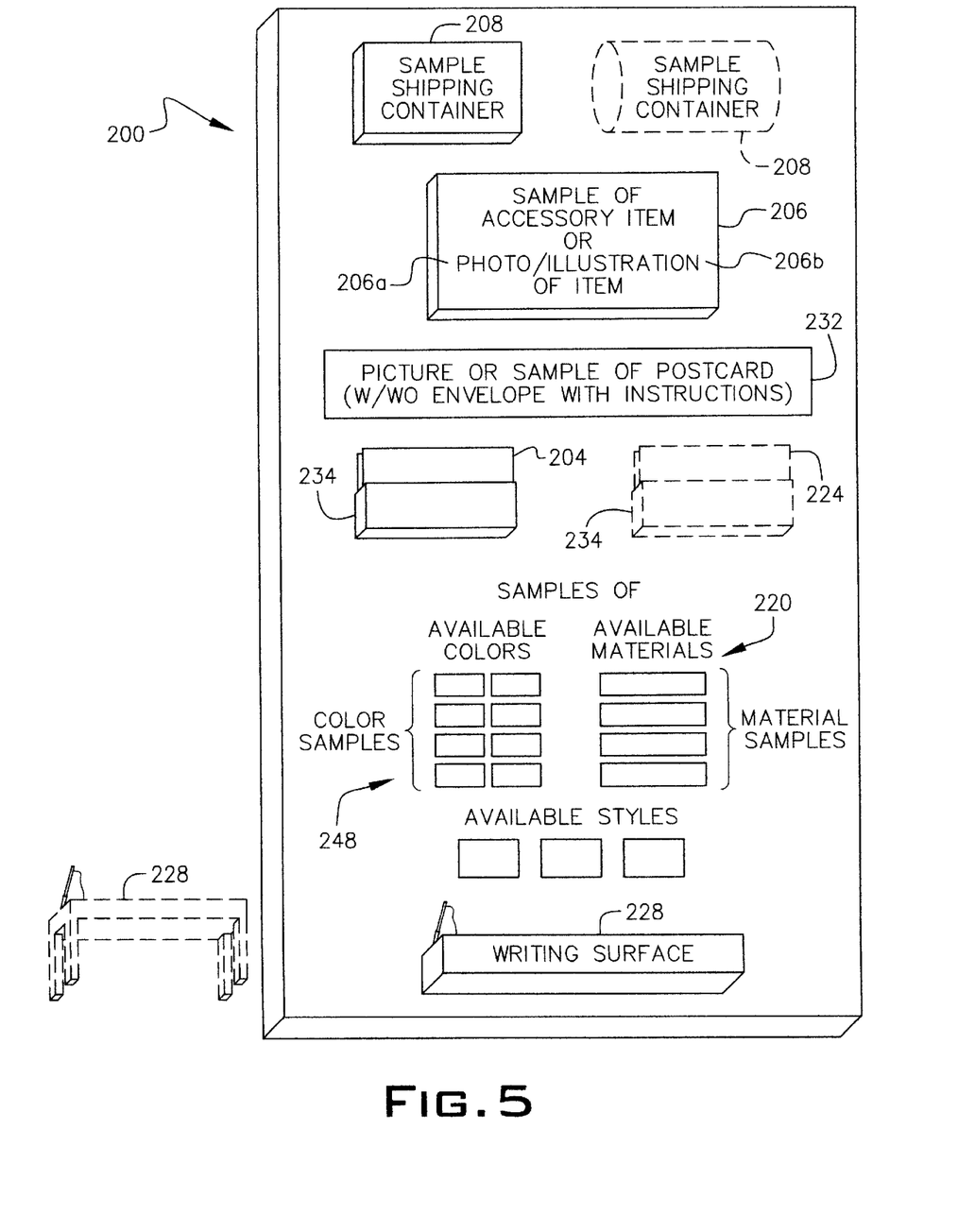
FIG. 5 is a conceptual depiction of a display used in a retail establishment utilizing the present invention method.

Referring now to the drawings, FIG. 1 depicts the general overall process or method of the present invention and is generally represented by numeral 100, while FIG. 5 is a conceptual depiction of the inventive display used with the inventive process 100, the display being represented by the numeral 200.

The present invention is a method 100 for packaging and delivering accessory items in a retail business environment. The method comprises the providing of a package and delivery system display 200 in a retail business establishment 202 as shown in FIGS. 2–5. The display 202 includes a separable postcard and order combination card 204, and an example of an accessory item 206 offered for sale by the retail business establishment 202. The combination card 204 is typically separable by a tear perforation as depicted by 222 in FIGS. 6–9.

Figure 6:
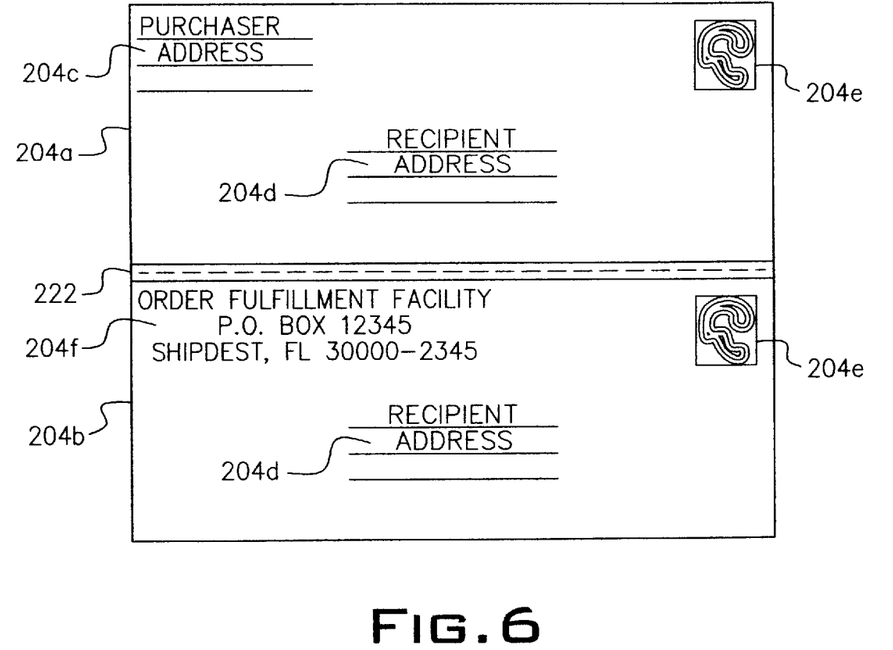
FIG. 6 is a conceptual depiction of one side of the combination postcard/order card.

The purchaser, who is a consumer shopping locally or when traveling as a tourist or on vacation, takes the postcard and order combination card 204 from the display 200 after deciding to purchase a desired accessory item represented by the example 206 on the display 200. The purchaser then typically annotates a name and address of an intended recipient (see FIG. 6) on the order portion 204b of the combination card 204, presents the combination card 204 to a cashier and purchases the desired accessory item 210 by paying a pre-calculated price, the pre-calculated price including all shipping and handling fees for shipping the desired accessory item to the intended recipient by one of private and governmental mail and package delivery methods. This can be UPS, Fedex, USPS or any other domestic and global mail and package delivery system available where the item is being purchased. As shown in FIG. 6, it is anticipated that the name and address of the order fulfillment facility may appear as a return address 204f on the order portion 204b and the appropriate indication of shipping postage 204e may also appear on the order portion 204b. Although this is not necessary, it would be a convenient method of ensuring that the purchaser pre-pays the appropriate shipping costs and the order fulfillment facility may then be able to use this side of the order portion 204b as a shipping/mailing label for insertion in a clear sleeve attached to the shipping container 208.

The retailer retains the order portion 204b of the combination card 204 and the purchaser retains the postcard portion 204a of the combination card 204. The retailer then forwards the order portion 204b of the combination card 204 to an order fulfillment facility.

The order fulfillment facility then places the name and address of the intended recipient on a shipping container 208 containing the purchased desired accessory item and then mails or ships the shipping container 208 to the intended recipient by the selected private or governmental mail and package delivery method.

The use of the display 200 and inventive process 100 allows the retailer to maintain a substantially inventory free supply of the accessory item 210. That is, the retailer need only keep what it needs for examples (samples) 206 to be mounted or attached on the display 200.

Figure 2:
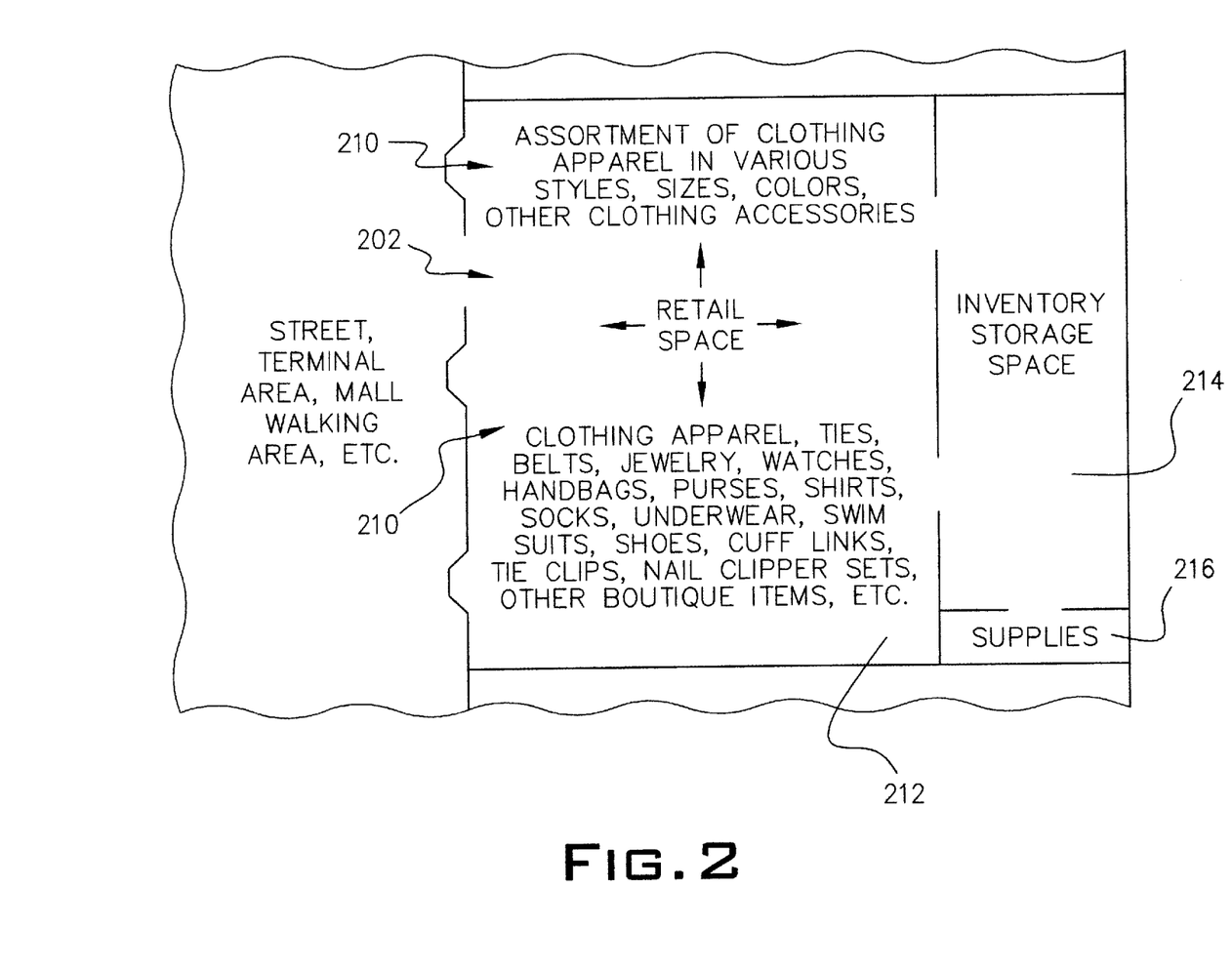
FIG. 2 is a typical store conceptual layout showing stocked retail items on the retail floor space and designated floor space for inventory and supplies.

For example, FIG. 2 is a typical store conceptual layout showing stocked retail items 210 on the retail floor space 212 and designated floor space for inventory 214 and supplies 216. A typical retail business 202 may have accessory items 210 such as racks of shirts and blouses in various sizes, colors and styles. Such a retailer would also have ties, scarves, belts, purses, wallets, handbags, socks, underwear, shoes, swim suits, cuff links, tie clips, nail clipper sets, and several other boutique/novelty items associated with items such as clothing apparel. It should be stressed that the invention could apply to almost any type of retail goods found in gift shops, department stores, tax-free trade zones, airport terminals, cruise ships' stores, among others.

In these types of operations, the retailer has to compromise between variety of goods offered and styles of goods offered along with an inventory supply of the goods offered, because the retailer is limited to a happy medium between overhead costs associated with purchasing the goods, the monthly rental costs per square foot for the retail premises, the available retail floor space 212, the available inventory storage floor space 214 and the available floor space needed to maintain its operating supplies and files 216.

Figure 3:
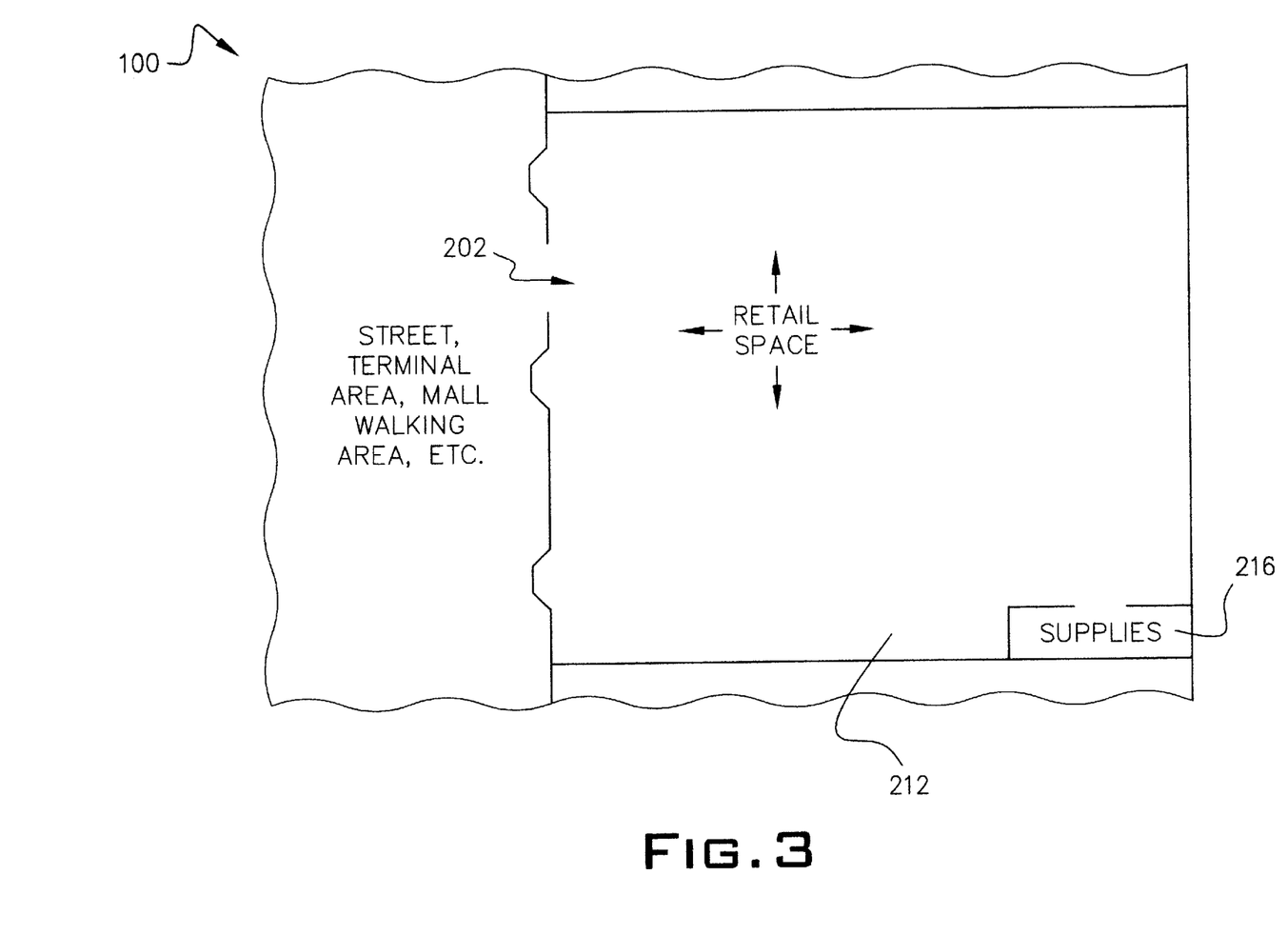
FIG. 3 is a typical store conceptual layout showing the substantial gain in floor space available for retail offers using the system and process of the present invention.

As shown in FIG. 3, a retailer previously operating under the concept depicted in FIG. 2 can maintain a minimal inventory sufficient to use and mount on the displays 200, thereby allowing the retailer to offer several more varieties of goods with minimal overhead associated with the purchase of the goods. Alternatively, the retailer may opt to rent less space thereby significantly reducing its overhead costs associated with floor space rental.

Figure 4:
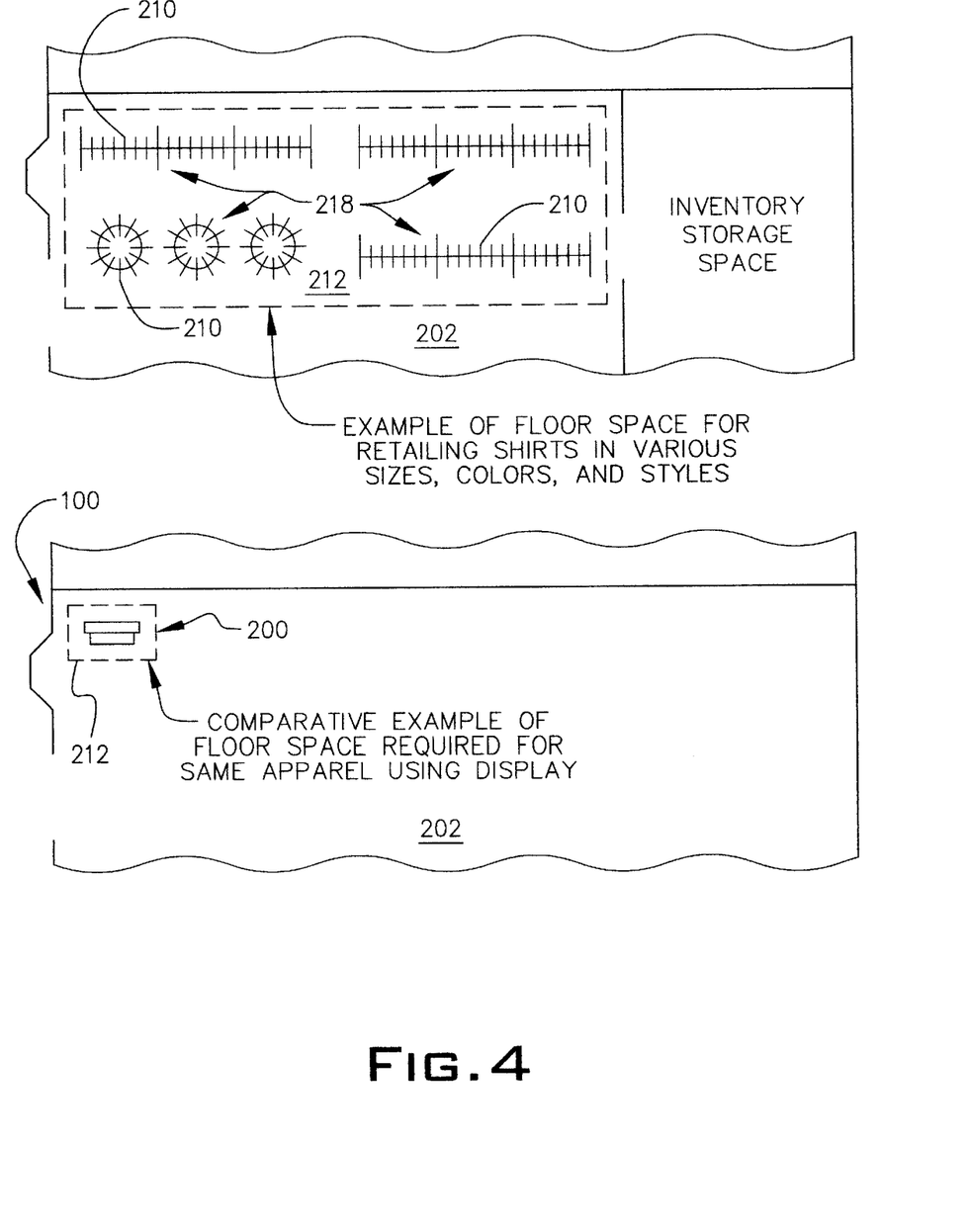
FIG. 4 is a typical depiction of floor space needed to rack a relatively large inventory of stocked shirts as an example of an accessory item which can be purchased under existing retail methods in comparison to conceptual floor space needed to sell the same accessory item in the inventory free system and process of the present invention.

In order to provide a further example of the floor space reduction obtained by implementing the present inventive process 100, FIG. 4 is a typical depiction of floor space 212 needed using racks 218 for a relatively large inventory of stocked accessory items 210, for example, shirts, which can be purchased under existing retail methods in comparison to the resultant conceptual floor space 212 needed to sell the same accessory item 210 in the inventory free system and process 100 of the present invention. Display 200 may literally take only a few square feet of floor space, while the rack system can take several square feet of floor space of the order of 10 times that required for the inventive display 200 to several hundred square feet of floor space, depending on the size and nature of the retail business. Although the example uses racks to hang shirts, any kind accessory item including novelty and boutique items, jewelry items, watches, socks, ties, etc., stocked on racks or tables could be applied to the example of how a few square feet of space can replace several square feet of space using the inventory free display and method of retailing presented herein.

The example 206 on the display 200 can be a sample of the accessory item itself 210 to be sold, photographs 206a of the accessory item, illustrations 206b of the accessory item, and any combinations thereof. The example 206 may be covered with a protective clear laminate or framed or simply not covered. If an actual sample 210 is used, then the retailer may want to leave it uncovered so customers can touch and feel the material. Certainly, if the retailer wants to protect the limited sample 206 it has from being soiled by customer handling, then, it may cover the sample 206, whether the sample 206 be an actual sample 210, a photograph 206a or illustration 206b, and instead include some material swatches 220 on the display 200, as further discussed hereinafter.

Because most accessory item contemplated for use by the present invention are generally complimentary to clothing or dressing, it is anticipated that the preferred embodiment include accessory items in the category of clothing apparel. As mentioned above, clothing apparel typically includes clothing accessories and boutique (novelty) items for clothing.

Typically, when a consumer approaches the display 200, the consumer or purchaser may see an actual representation of the shipping container 208 that would be used to ship the purchased item 210 to an intended recipient. From a marketing viewpoint, displaying a representation of the container 208 with the features on the container 208 as described below may be appealing to the potential purchaser to purchase the item, knowing what the packaging will look like. Therefore, in a preferred embodiment, it is recommended that a representative shipping container 208 be included on the display 200. The shipping container 208 may be shaped to accommodate the item being shipped, that is, it may be tubular in form, or square or rectangular in form, that is, box-shaped. In most cases, it is anticipated that the shipping container 208 will be box-shaped.

As mentioned above, the purchaser can maintain the postcard portion 204a as a receipt of the accessory item 210 purchased or the purchaser may mail or give (hand deliver) the postcard portion to a third party intended recipient who is to receive the accessory item 210 as a gift or for whom the accessory item 210 was proxy purchased by the purchaser.

The conceptual depiction of the display of FIG. 5 can in a sense be miniaturized with a simplified display. For example, the mailer example can be combined with the postcard portion/order portion combination card, where the postcard portion is in the form of a greeting card, such as a Hallmark® card. The greeting card company would essentially be tying its business themes with product line in a product inventory free store. That is, the invention would offer a way for greeting card/combo cards to be used to advertise, promote, and acknowledge the gift giving process.

As shown in FIG. 6, in one embodiment of the postcard 204a, one side includes a designated portion for annotating an originator or sender of the postcard 204a as shown at 204c, and a second designated portion 204d for annotating to whom the postcard 204 is to be delivered. Of course, space is allocated for the postage, shipping labels, or the like as shown at 204e.

Figure 7:
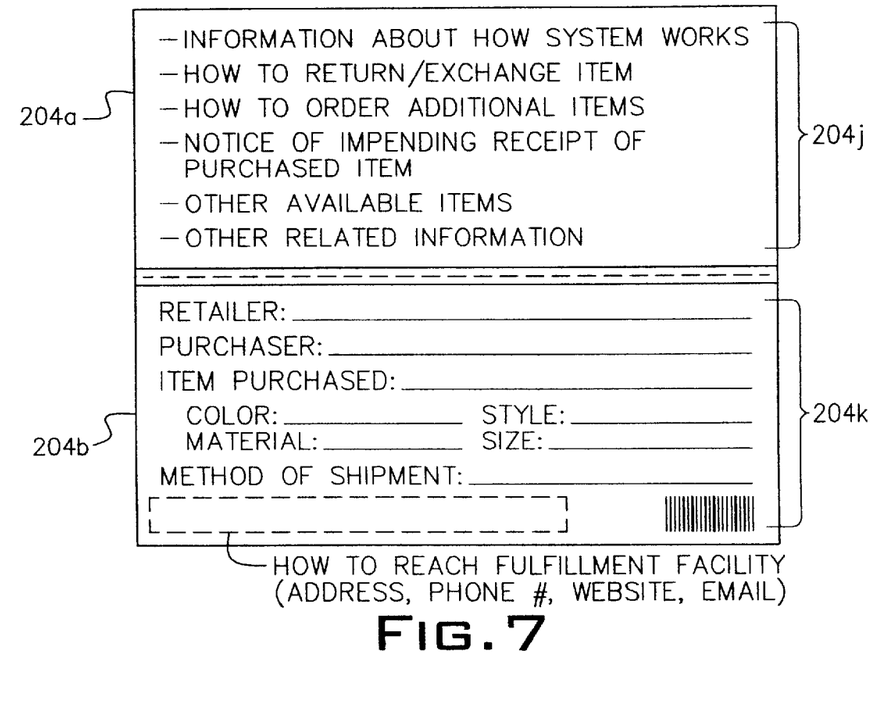
FIG. 7 is a conceptual depiction of the typical type of information that may be presented on the side opposite FIG. 6.

As shown in FIG. 7, the opposite side of the postcard portion 204a further typically includes one of instructions about the eventual receipt of the purchased accessory item, information on how to order additional accessories, information on how to return or exchange the purchased accessory item, information as to what other accessory items are available for purchase, information as to how the package and delivery system works, and any combinations thereof, all of these text indicia being represented by the numeral 204j in FIG. 7.

Figure 9:
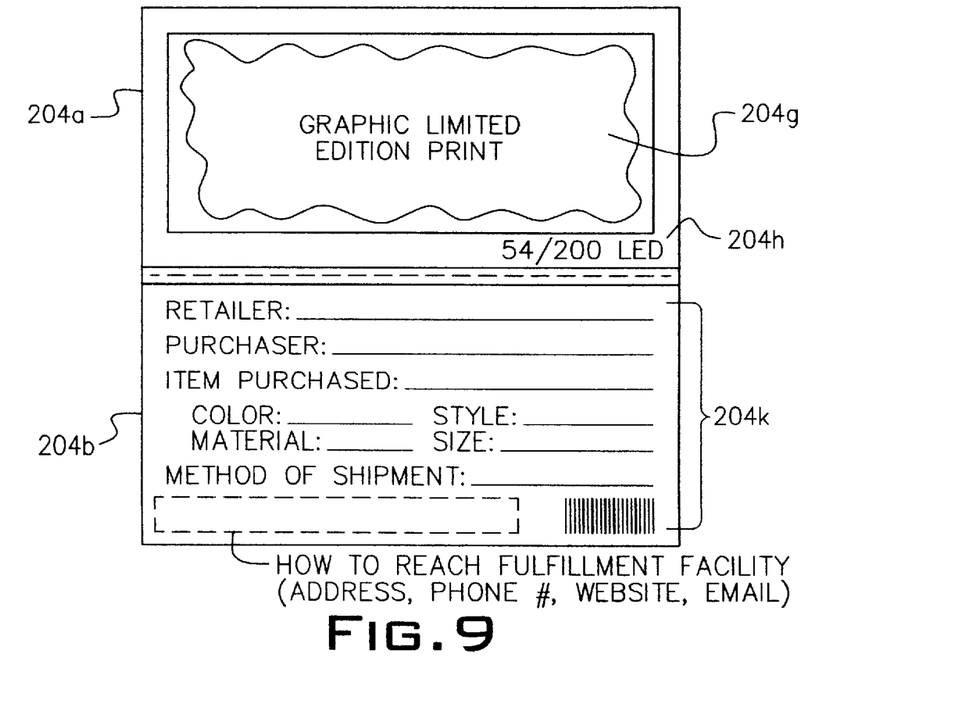
FIG. 9 is an alternative conceptual depiction of the side of the combination card depicted in FIG. 7.

As shown in FIGS. 7 and 9, the opposite side of the order portion 204b of the combination card 204 typically includes the name of the retailer, pricing data, which can be an item bar code readably programmed to provide the price or actual indicated price, and information to reach the order fulfillment facility by one of address, telephone number, internet website, and email address or combinations thereof, all of these text indicia being generally represented by the numeral 204k, and any combinations thereof.

Of course, the order portion should also include confirmatory information such as the name of the retailer, the name of the purchaser, possibly the address of the purchaser, the item purchased including any indication of color, material, style and size desired, and method of shipment, again these features included by the general representative numeral 204k.

Figure 10:
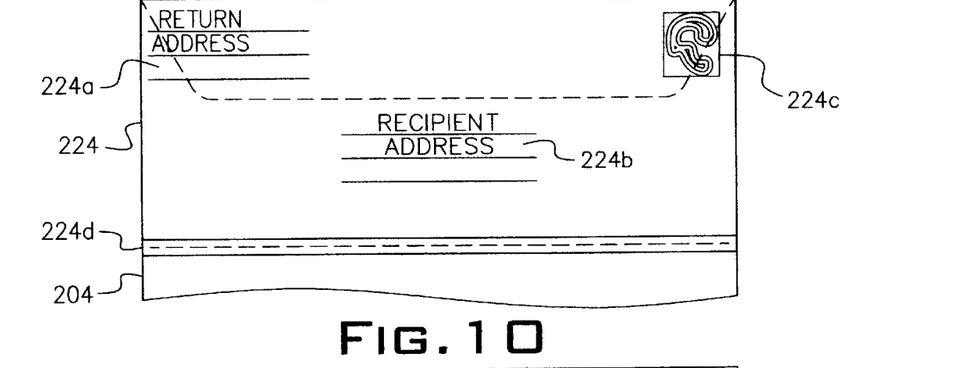
FIG. 10 is a conceptual alternative embodiment adding the use of an envelope which is separably attached to the combination card depicted in FIGS. 6–9.
Figure 11:
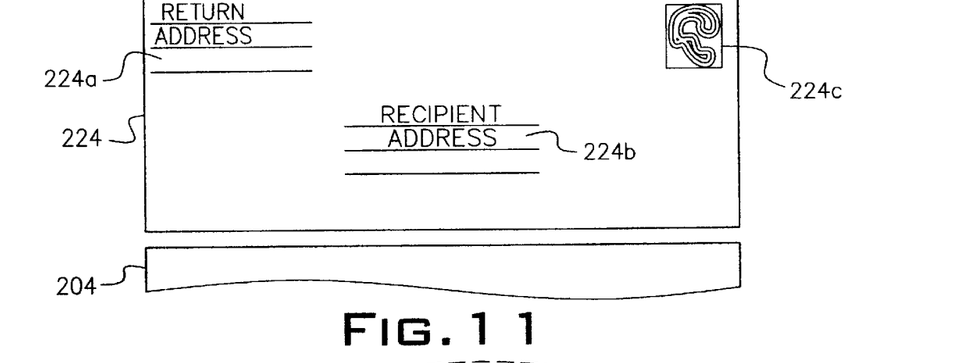
FIG. 11 is a conceptual alternative embodiment adding the use of an envelope which is separate from the combination card depicted in FIGS. 6–9.
Figure 12:
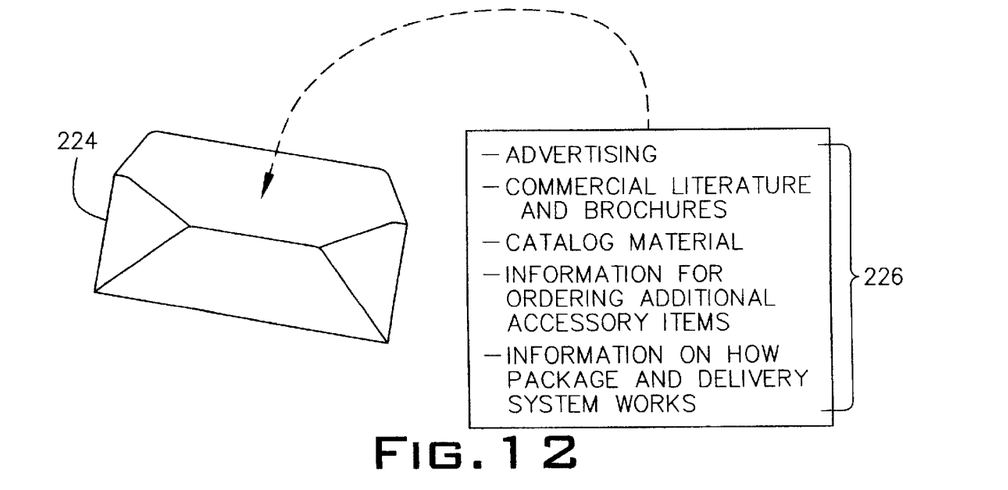
FIG. 12 is a conceptual depiction of the type of information that may be included in the envelope.

In situations when the order fulfillment facility or the retailer or both wish to provide information more inclusive as to what is allowable with the limited space available for textual indicia on a postcard size document, such as when additional accessory items are being offered through literature, brochures or mini-catalogs, or when advertisement material is to be included in the shipment, that is, additional predetermined advertising and commercial expressions to promote other accessory items, all generally represented by the numeral 226 in FIG. 12, an optional embodiment of the postcard and order combination card 204 is to include an envelope 224 as shown in FIGS. 10–12. In one embodiment, envelope 224 may be detachably attached to the combination card 204 as shown as perforated tear line 224a. It does not matter whether the envelope is attached to the post card portion 204a or the order portion 204b, although attaching it to the order portion 204b may be more practical. In another embodiment, the envelope 224 is separate from the combination card 204 as shown in FIG. 11. As alluded to above, the envelope 224 can also contain additional information for ordering other accessory items (226). Typical additional information 226 as described above, would be stuffed in the envelope 224 and separately mailed to the recipient by the retailer or order fulfillment facility.

Envelope 224 would therefore include designated portions 224a, 224b for annotating a return mail address of the sender, typically the retailer or order fulfillment facility and a mailing address of the recipient. The sender would apply the necessary postage (224c).

One of the eye catching or appealing aspects of the present invention is the use of screen printing on the shipping containers 208. Graphic style screen printing is not only a hidden persuasive tool to sub-consciously suggest to a buyer to purchase items associated with the appealing container, screen printing serves to provide a pleasing alternative to gift wrapping, that is, the screen printed box serves as a gift wrapped box. Designated portions 230 of the shipping container 208 can be screen printed as depicted on FIG. 13. This screen printing can also be in the form of desired advertising and commercial expressions and other indicia on the shipping containers 208 supplied by the corrugated supplier.

The order fulfillment facility can be a distribution center operated by the retailer itself, a distribution center operated by a manufacturer of the accessory item, or a distribution center operated by an independent third party distributor, and a combination thereof.

As mentioned above, when the item is a gift, the purchaser mails the postcard portion 204a to the third party recipient who is to receive the accessory item 210 to be gifted. In this case, the postcard portion 204a serves as a notification to the third party recipient of the impending receipt of the gifted accessory item 210. On the other hand, when the recipient is one on whose behalf the accessory item 210 was purchased, the purchaser would mail the postcard portion 204a to the third party recipient on whose behalf the accessory item was proxy purchased.

In order to facilitate a purchase providing necessary addressee information and for selecting available options as described above, it is recommended that a shelf 228 be provided for completing requested information on the combination card 204, the shelf 228 serving as a writing surface and being one of attachably projecting from the display 200 and adjacent to the display 200, as shown in FIG. 5.

The display is typically provided with instructions describing what the package and delivery system is and how to use the package and delivery system as depicted as 232 in FIG. 5. The instructions could include a photo image of the combination card (with or without the envelope) and additional printed information on the display 200 itself or on separate literature or brochures available for reading at the display or taking for later reading.

The display 200 is provided with means for holding a plurality of the combination cards 204. This can be a holder or a bracket 234 or by other means known in the art to include a number of combination cards 204 with the display 200. Of course, means for holding a plurality of the combination cards 204 and attached envelopes 224 on the display 200 may be provided such as holder or bracket 234 described above. In addition, if the plurality of envelopes 224 are separate, then the means 234 may be separately provided for holding the envelopes 224.

Figure 13:
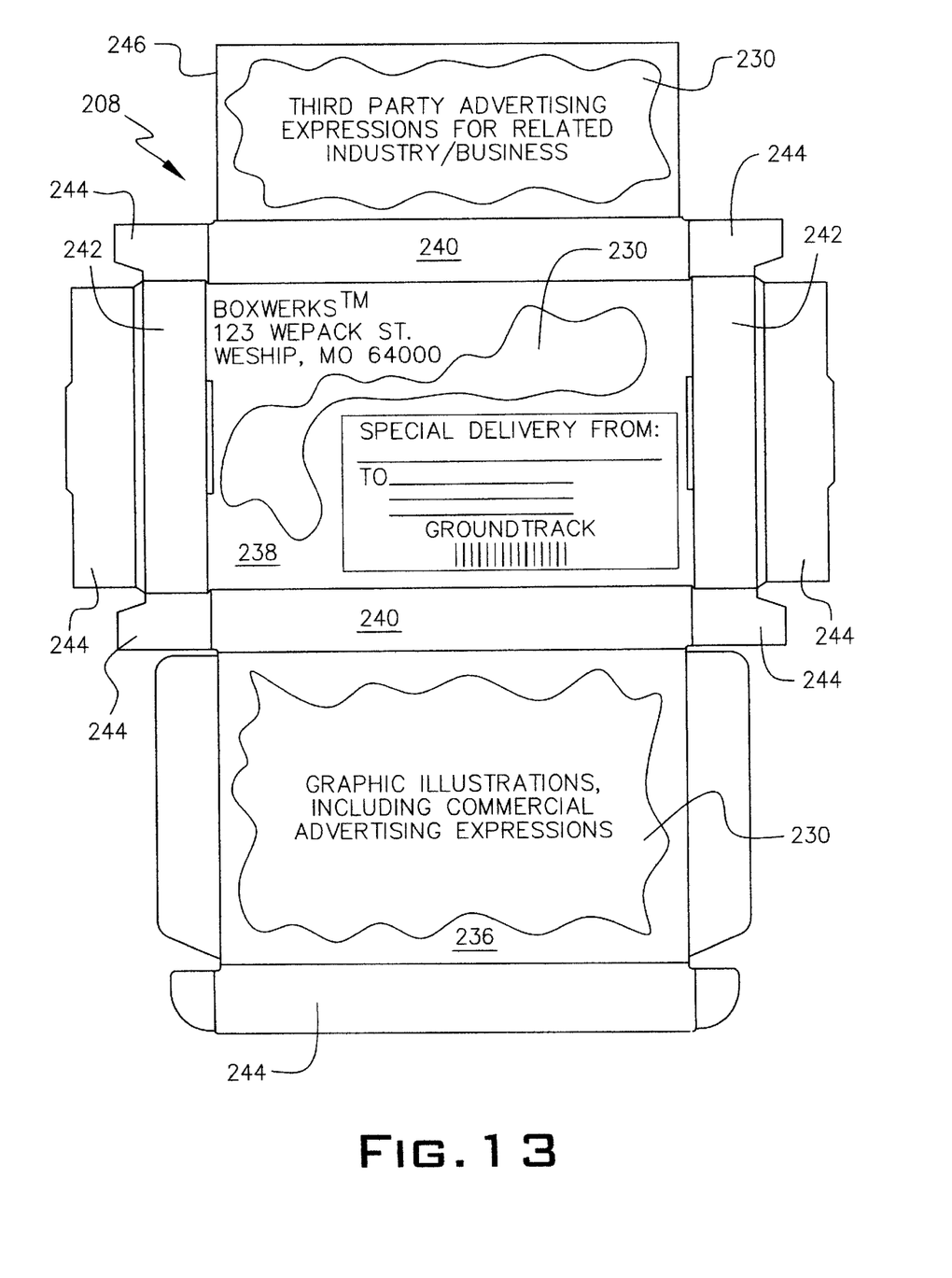
FIG. 13 is conceptual representation of a typical shipping container, including textual indicia and graphic indicia that may be optional included on the shipping container.

The shipping container 208 comprises a mailer for packaging the accessory item 210, the mailer having a front panel 236, a back panel 238, and respective sides 240, ends 242 and tabs 244 adapted for foldably forming a closed shipping container 208 prior to mailing. In another embodiment, the shipping container 208 is further provided with an additional panel 246 which folds inside said closed shipping container 208. The additional inside panel 246 would typically include screen printed advertising and commercial expressions 230 such as graphic illustrations (design) and text indicia.

The advertising and commercial expressions 230 screen printed on the inside panel 246 may typically relate to one of the retailer's accessory items offered for sale, other services and products sold by the retailer, services and products sold by independent third party business establishments, and any combinations thereof.

It is also a preferred embodiment when item 210 potentially come in different materials and/or textures or colors that the display 200 be provided with a designated location 248 for displaying material swatches as examples of materials and colors available in purchasing the desired accessory item 210.

Figure 8:
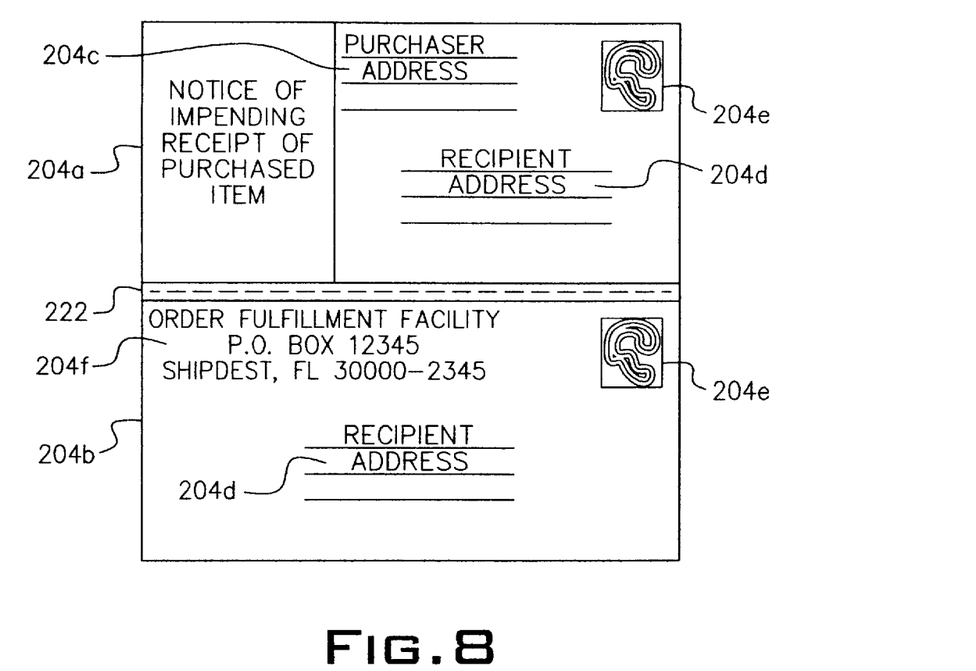
FIG. 8 is an alternative conceptual depiction of the side of the combination card depicted in FIG. 6.

Similar to the graphic design for the shipping container 208 described above, the postcard portion 204a may also be provided with a graphic design 204g with the graphic design 204g being limited in production and having indicia 204h so as to render each postcard portion 204a a collectible item. FIG. 9 depicts such a conceptual arrangement of a postcard portion 204a. In such a case, there would be limited space for providing any information other than notification of receipt of an impending item 210 and other limited information. In such a circumstance, FIG. 8 provides a suggestion that the address side of the postcard portion 204a include such limited information, therefore allowing the opposite side to be maintained as a limited edition print that one could place in a frame. A protective laminate, not shown, may also be placed on the limited edition print side to protect it while it is in the mail process or being handled by hand.

The same type of information that may be included in the envelope 224 described above may be included by the order fulfillment facility in the shipping container 208 itself, which is sent to the intended recipient information, for example, information as to how to reach the order fulfillment facility by providing one of an address, a telephone number, an internet website, an email address, and any combinations thereof.

As alluded to above, the order fulfillment facility may place the desired accessory item 210 in the shipping containing 208 before placing the name and address of the intended recipient on the shipping container 208; or the order fulfillment facility may pre-package each accessory item 210, wherein the order fulfillment facility selects the pre-packaged shipping container 208 containing the desired purchased accessory item 210 before placing the name and address of the intended recipient on the pre-packaged shipping container 208 and subsequently mails the pre-packaged shipping container 208 to the intended recipient.

Figure 14:
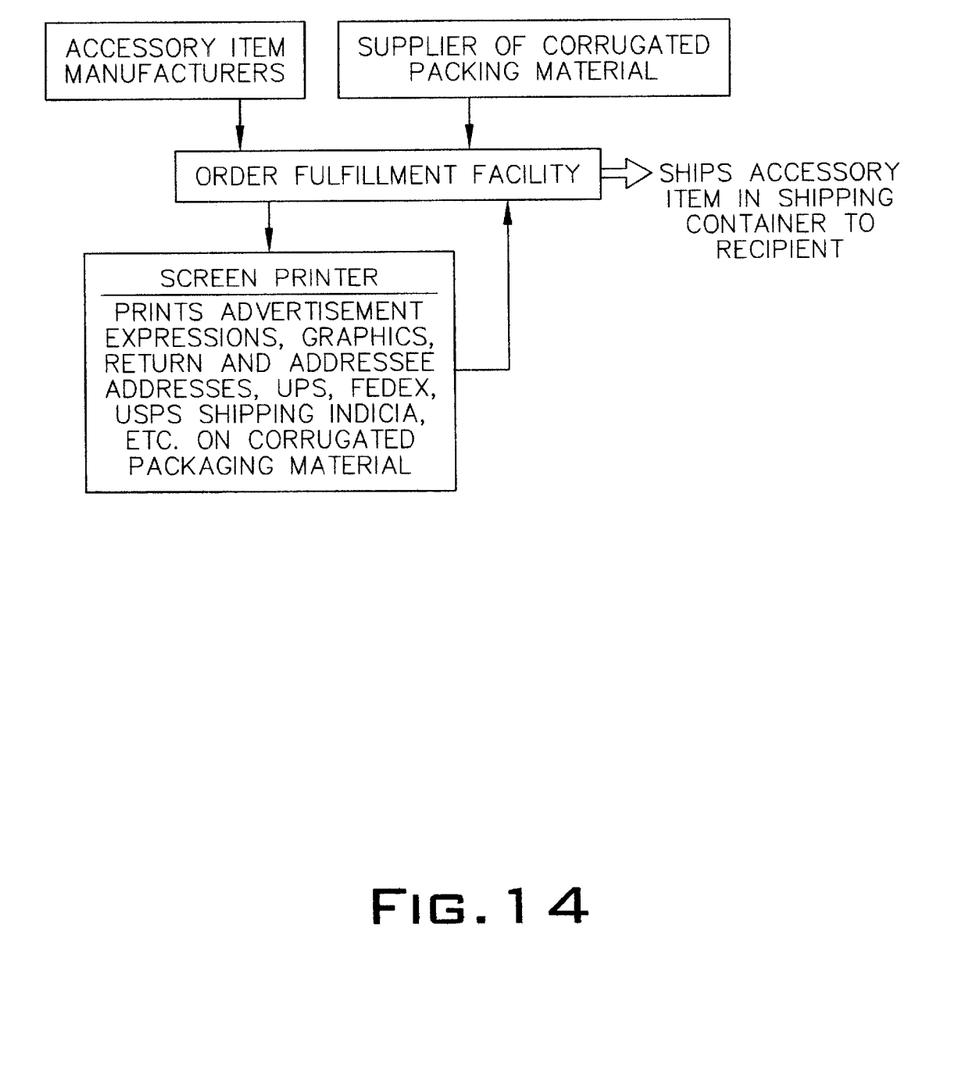
FIG. 14 is a flow chart representing conceptually the order fulfillment facility receiving accessory items from manufacturers and corrugated packaging material from suppliers which, in turn, is screen printed with appropriate text and graphic indicia.

As depicted in FIG. 14, the order fulfillment facility is generally provided with the corrugated materials used for packaging the purchased items 210 and the center would also have the items 210 shipped to it by the manufacturer of the accessory items 210. The corrugated materials are preferably scored for facilitating the forming of the shipping containers 208. Although the supplier of the corrugated material may have screen printing capabilities, it is anticipated that the center will have to contract with a screen printer to print all of the desired information typical of what is shown conceptually in FIG. 13, an example of a box-shaped shipping container 208. The screen printer would then send the finished shipping containers to the center for shipping purchased items 210 to recipients.

More specifically addressing the display 200, the invention includes a package and delivery system display 200 for a retail business entity 202, the display 200 comprising means for displaying an example 206 of an accessory item 210 offered for sale by the retail business establishment 202. The display means 200 is located in a retail business entity 202.

An example 206 of an accessory item 210 offered for sale is mounted on the display means 200. The display means 200 further includes at least one postcard and order combination card 204, each combination card 204 being separable into a postcard portion 204a and an order portion 204b as more fully described above.

The display means 200 further includes means 234 for holding the plurality of combination cards 204 and includes information, generally depicted as 232 in FIG. 5, on how the accessory item 210 represented by the displayed example 206 may be purchased by the purchaser, on how to complete the order portion and the postcard portion of the combination card 204, and information related to the process of purchasing the accessory item 210.

The display means 200 further includes a sample 208 of a package shipping container representative of another shipping container in which the purchased accessory item 210 would be shipped to the intended recipient; and the display means 200 has means 228 for the purchaser to complete the order portion 204b and the postcard portion 204a of the combination card 204.

As mentioned above, the example 206 on the display means 200 is one of the accessory item 210 itself, photographs 206a of the accessory item 210, illustrations 206b of the accessory item 210, and any combinations thereof.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

Now that the invention has been described,

What is claimed is:

1. A method for packaging and delivering accessory items in a retail business environment, the method comprising:
   providing a package and delivery system display in a retail business establishment, the display including a separable postcard and order combination card, and an example of an accessory item offered for sale by the retail business establishment,
   wherein a purchaser takes the postcard and order combination card from the display after deciding to purchase a desired accessory item represented by the example on the display, the purchaser annotates a name and address of an intended recipient on the order portion of the combination card, presents the combination card to a cashier and purchases the desired accessory item by paying a pre-calculated price, the pre-calculated price including all shipping and handling fees for shipping the desired accessory item to the intended recipient by one of private and governmental mail and package delivery methods, and
   wherein the retailer retains the order portion of the combination card and the purchaser retains the postcard portion of the combination card;
   the retailer then forwarding the order portion of the combination card to an order fulfillment facility;
   the order fulfillment facility then placing the name and address of the intended recipient on a shipping container containing the purchased desired accessory item; and
   the order fulfillment facility then mailing said shipping container to the intended recipient by the selected private or governmental mail and package delivery method,
   wherein the retailer is able to maintain a minimal inventory of said accessory item.

2. The method according to claim 1, wherein the example on the display is one of the accessory item itself, photographs of the accessory item, illustrations of the accessory item, and any combinations thereof.

3. The method according to claim 1, wherein the accessory item is a clothing apparel.

4. The method according to claim 3, wherein the clothing apparel is one of clothing accessories and novelty items for clothing.

5. The method according to claim 1, wherein the purchaser maintains the postcard as a receipt of the accessory item purchased.

6. The method according to claim 1, wherein the postcard portion includes a designated portion for annotating an originator of the postcard, and a second designated portion for annotating to whom the postcard is to be delivered.

7. The method according to claim 6, wherein the postcard portion further includes one of instructions about the eventual receipt of the purchased accessory item, information on how to order additional accessories, information on how to return or exchange the purchased accessory item, information as to what other accessory items are available for purchase, information as to how the package and delivery system works, and any combinations thereof.

8. The method according to claim 6, further comprising:
providing a shelf for completing requested information on the combination card, the shelf serving as a writing surface and being one of attachably projecting from the display and adjacent to the display.

9. The method according to claim 6, wherein the postcard is delivered to the intended recipient by one of mailing and hand-delivery.

10. The method according to claim 1, wherein the accessory item purchased is intended to be one of a purchase for the purchaser, a gift from the purchaser to a third party recipient, and a proxy purchase by the purchaser on behalf of said third party recipient.

11. The method according to claim 10, further comprising:
the purchaser mailing the postcard portion to the third party recipient who is to receive the accessory item to be gifted,
wherein the postcard portion serves as a notification to the third party recipient of the impending receipt of the gifted accessory item.

12. The method according to claim 10, further comprising:
the purchaser mailing the postcard portion to the third party recipient on whose behalf the accessory item was proxy purchased,
wherein the postcard portion serves as a notification to the third party recipient of the impending receipt of the purchased accessory item.

13. The method according to claim 1, wherein the order portion of the combination card further comprises:
pricing data, information to reach the order fulfillment facility by one of address, telephone number, internet website address, internet email address, identifying information for the retailer, identifying information for the purchaser, a description of the item purchased, an indicia of the method of shipment chosen, and any combinations thereof.

14. The method according to claim 1, further comprising:
providing an envelope with the display, the envelope being one of detachably attached to the postcard portion and separately provided on the display.

15. The method according to claim 14, wherein the envelope includes designated portions for annotating a return mail address of a sender of the envelope and a mailing address of the recipient.

16. The method according to claim 14, wherein the envelope further includes one of instructions about the eventual receipt of the purchased accessory item, information on how to order additional accessories, information on how to return or exchange the purchased accessory item, information as to what other accessory items are available for purchase, information as to how the package and delivery system works, additional predetermined expressions, including advertising and commercial expressions to promote other accessory items, and any combinations thereof.

17. The method according to claim 14, further comprising:
providing means for holding a plurality of the combination cards and attached envelopes on the display.

18. The method according to claim 14, further comprising:
providing means for holding a plurality of the envelopes on the display.

19. The method according to claim 1, wherein the fulfillment facility is supplied with shipping containers for shipping purchased accessory items from a corrugated supplier, with displays for distribution to retail business establishments from a display manufacturer, and with accessory items from manufacturers of said accessory items.

20. The method according to claim 19, wherein a screen printer further prints desired advertising and commercial indicia on the shipping containers supplied by the corrugated supplier.

21. The method according to claim 1, wherein the order fulfillment facility is one of a distribution center operated by the retailer, a distribution center operated by a manufacturer of the accessory item, a distribution center operated by an independent third party distributor, and a combination thereof.

22. The method according to claim 1, further comprising:
providing instructions with the display describing what the package and delivery system is and how to use the package and delivery system.

23. The method according to claim 1, further comprising:
providing means for holding a plurality of the combination cards on the display.

24. The method according to claim 1, wherein the shipping container comprises:
a mailer for packaging the accessory item, the mailer having a front panel, a back panel, and respective sides, ends and tabs adapted for foldably forming a closed shipping container prior to mailing.

25. The method according to claim 24, further comprising:
providing a graphic design on designated outside surfaces of said formed closed shipping container mailer, said graphic design facilitating the use of the shipping container as a gift pre-wrapped container.

26. The method according to claim 24, wherein the shipping container further comprises:
an additional panel which folds inside said closed shipping container.

27. The method according to claim 26, wherein the additional inside panel includes screen printed advertising and commercial expressions.

28. The method according to claim 27, wherein the advertising and commercial expressions on the inside panel relates to one of the retailer's accessory items offered for sale, other services and products sold by the retailer, services and products sold by independent third party business establishments, and any combinations thereof.

29. The method according to claim 1, further comprising:
providing a designated location on the display for displaying material swatches as examples of materials and colors available in purchasing the desired accessory item.

30. The method according to claim 1, further comprising:
providing a graphic design on the postcard portion, the graphic design being limited in production and having indicia so as to render each postcard portion a collectible item.

31. The method according to claim 1, further comprising:
the order fulfillment facility including with said shipping container to be sent to the intended recipient information as to how to reach the order fulfillment facility by providing one of an address, a telephone number, an internet website, an email address, and any combinations thereof.

32. The method according to claim 1, further comprising:
the order fulfillment facility placing the desired accessory item in the shipping container before placing the name and address of the intended recipient on the shipping container.

33. The method according to claim 1, further comprising:
the order fulfillment facility pre-packaging each accessory item,
wherein the order fulfillment facility selects the pre-packaged shipping container containing the desired purchased accessory item before placing the name and address of the intended recipient on the pre-packaged shipping container and subsequently mailing said pre-packaged shipping container to the intended recipient.

34. A package and delivery system display for a retail business entity, the display comprising:
means for displaying an example of an accessory item offered for sale by the retail business establishment;
the display means being located in a retail business entity;
an example of an accessory item offered for sale mounted on the display means;
the display means further including at least one postcard and order combination card, each combination card being separable into a postcard portion and an order portion;
the order portion of the combination card having designated locations for a purchaser to annotate a name and address of an intended recipient;
the postcard portion of the combination card having a designated portion for annotating an originator of the postcard, and a second designated portion for annotating to whom the postcard is to be delivered;
the display means further comprising means for holding the plurality of combination cards;
the display means further including information on how the accessory item represented by the displayed example may be purchased by the purchaser, on how to complete the order portion and the postcard portion of the combination card, and information related to the process of purchasing the accessory item;
the display means further including a sample of a package shipping container representative of another shipping container in which the purchased accessory item would be shipped to the intended recipient; and
the display means having means for the purchaser to complete the order portion and the postcard portion of the combination card.

35. The display according to claim 34, wherein the example on the display means is one of the accessory item itself, photographs of the accessory item, illustrations of the accessory item, and any combinations thereof.

36. The display according to claim 34, wherein the accessory item is a clothing apparel.

37. The display according to claim 36, wherein the clothing apparel is one of clothing accessories and novelty items for clothing.

38. The display according to claim 34, wherein the postcard portion of the combination card serves as a receipt for the accessory item purchased.

39. The display according to claim 34, wherein the postcard portion includes a designated portion for annotating an originator of the postcard, and a second designated portion for annotating to whom the postcard is to be delivered.

40. The display according to claim 39, wherein the postcard portion further includes one of instructions about the eventual receipt of the purchased accessory item, information on how to order additional accessories, information on how to return or exchange the purchased accessory item, information as to what other accessory items are available for purchase, information as to how the package and delivery system works, and any combinations thereof.

41. The display according to claim 34, wherein the order portion of the combination card further comprises:
pricing data, information to reach the order fulfillment facility by one of address, telephone number, internet website, email address, identifying information for the retailer, identifying information for the purchaser, a description of the item purchased, an indicia of the method of shipment chosen, and any combinations thereof.

42. The display according to claim 34, further comprising:
a graphic illustration of the postcard and order combination card, the graphic illustration including an example of how to complete the order portion of the combination card including the designated locations for the purchaser to annotate the name and address of the intended recipient, and how to complete the postcard portion of the combination card including the designated portion for annotating the originator of the postcard, and the second designated portion for annotating to whom the postcard is to be delivered.

43. The display according to claim 34, wherein the means for the purchaser to complete the order portion and the postcard portion of the combination card comprising a writing surface, the writing surface being one of detachably projecting from the display and adjacent to the display.

44. The display according to claim 34, further comprising:
a designated location for displaying material swatches as examples of materials and colors for which is available for the purchasing of the accessory item.

45. The display according to claim 34, further comprising:
a plurality of envelopes, each envelope being one of detachably attached to the combination card and separately provided on the display.

46. The display according to claim 45, wherein each envelope includes designated portions for annotating a return mail address of a sender and a mailing address of the recipient.

47. The display according to claim 45, wherein each envelope further includes one of instructions about the eventual receipt of the purchased accessory item, information on how to order additional accessories, information on how to return or exchange the purchased accessory item, information as to what other accessory items are available for purchase, information as to how the package and delivery system works, additional predetermined expressions, including advertising and commercial expressions to promote other accessory items, and any combinations thereof.

48. The display according to claim 34, wherein the shipping container in which the purchased accessory item would be shipped to the intended recipient further comprises:
a mailer for packaging the accessory item, the mailer having a front panel, a back panel, and respective sides, ends and tabs adapted for foldably forming a closed shipping container prior to mailing.

49. The display according to claim 48, wherein the shipping container further comprises:
an additional panel which folds inside said closed shipping container.

50. The display according to claim 49, wherein the additional inside panel includes screen printed advertising and commercial expressions.

51. The display according to claim 50, wherein the advertising and commercial expressions on the inside panel relates to one of the retailer's accessory items offered for sale, other services and products sold by the retailer, services and products sold by independent third party business establishments, and any combinations thereof.

52. The display according to claim 48, wherein the mailer further comprises:
a graphic design on designated outside surfaces of said formed closed shipping container, said graphic design facilitating the use of the shipping container as a gift pre-wrapped container.

53. The display according to claim 34, wherein the postcard portion further comprises:
a graphic design, the graphic design being limited in production and having indicia so as to render each postcard portion a collectible item.

54. A package and delivery system display for a retail business entity, the display comprising:
means for displaying an example of an accessory item offered for sale by the retail business establishment;
the display means being located in a retail business entity;
an example of an accessory item offered for sale mounted on the display means;
the display means further including at least one postcard and order combination card, each combination card being separable into a postcard portion and an order portion;
the order portion of the combination card having designated locations for a purchaser to annotate a name and address of an intended recipient;
the postcard portion of the combination card having a designated portion for annotating an originator of the postcard, and a second designated portion for annotating to whom the postcard is to be delivered;
the display means further comprising means for holding the plurality of combination cards;
the display means further including information on how the accessory item represented by the displayed example may be purchased by the purchaser, on how to complete the order portion and the postcard portion of the combination card, and information related to the process of purchasing the accessory item; and
the display means further including a sample of a package shipping container representative of another shipping container in which the purchased accessory item would be shipped to the intended recipient.

55. The display according to claim 54, wherein the postcard portion is a greeting card.

56. The display according to claim 54, wherein the display means further has means for the purchaser to complete the order portion and the postcard portion of the combination card.

57. The display according to claim 54, wherein the example on the display means is one of the accessory item itself, photographs of the accessory item, illustrations of the accessory item, and any combinations thereof.

58. The display according to claim 54, wherein the postcard portion of the combination card serves as a receipt for the accessory item purchased.

59. The display according to claim 54, wherein the postcard portion includes a designated portion for annotating an originator of the postcard, and a second designated portion for annotating to whom the postcard is to be delivered.

60. The display according to claim 59, wherein the postcard portion further includes one of instructions about the eventual receipt of the purchased accessory item, information on how to order additional accessories, information on how to return or exchange the purchased accessory item, information as to what other accessory items are available for purchase, information as to how the package and delivery system works, and any combinations thereof.

61. The display according to claim 54, wherein the order portion of the combination card further comprises:
pricing data, information to reach the order fulfillment facility by one of address, telephone number, internet website address, internet email address, identifying information for the retailer, identifying information for the purchaser, a description of the item purchased, an indicia of the method of shipment chosen, and any combinations thereof.

62. The display according to claim 54, wherein the shipping container in which the purchased accessory item would be shipped to the intended recipient further comprises:
a mailer for packaging the accessory item, the mailer having a front panel, a back panel, and respective sides, ends and tabs adapted for foldably forming a closed shipping container prior to mailing.

63. The display according to claim 62, wherein the shipping container further comprises:
an additional panel which folds inside said closed shipping container.

64. The display according to claim 63, wherein the additional inside panel includes screen printed advertising and commercial expressions.

65. The display according to claim 64, wherein the advertising and commercial expressions on the inside panel relates to one of the retailer's accessory items offered for sale, other services and products sold by the retailer, services and products sold by independent third party business establishments, and any combinations thereof.

66. The display according to claim 62, wherein the mailer further comprises:
a graphic design on designated outside surfaces of said formed closed shipping container, said graphic design facilitating the use of the shipping container as a gift pre-wrapped container.

67. The display according to claim 54, wherein the postcard portion further comprises:
a graphic design, the graphic design being limited in production and having indicia so as to render each postcard portion a collectible item.

* * * * *